(12) United States Patent
Chen et al.

(10) Patent No.: US 9,747,678 B2
(45) Date of Patent: Aug. 29, 2017

(54) CUSTOMS INSPECTION AND RELEASE SYSTEM AND METHOD

(71) Applicant: NUCTECH COMPANY LIMITED, Beijing (CN)

(72) Inventors: Zhiqiang Chen, Beijing (CN); Yuanjing Li, Beijing (CN); Xianghao Wu, Beijing (CN); Jundi Dai, Beijing (CN); Xu Fang, Beijing (CN); Yange Du, Beijing (CN); Yi Yan, Beijing (CN)

(73) Assignee: Nuctech Company Limited, Beijing (CN)

( * ) Notice: Subject to any disclaimer, the term of this patent is extended or adjusted under 35 U.S.C. 154(b) by 0 days.

(21) Appl. No.: 14/757,963

(22) Filed: Dec. 23, 2015

(65) Prior Publication Data

US 2016/0189356 A1 Jun. 30, 2016

(30) Foreign Application Priority Data

Dec. 26, 2014 (CN) .......................... 2014 1 0834408

(51) Int. Cl.
*G06K 9/00* (2006.01)
*G06T 7/00* (2017.01)
*G06Q 10/08* (2012.01)

(52) U.S. Cl.
CPC ........... *G06T 7/0002* (2013.01); *G06Q 10/08* (2013.01); *G06T 2207/10116* (2013.01)

(58) Field of Classification Search
CPC ........ G06T 7/0002; G06T 2207/10116; G06Q 10/08

(Continued)

(56) References Cited

U.S. PATENT DOCUMENTS

| 3,925,762 A | 12/1975 | Heitlinger et al. |
| 8,170,722 B1 | 5/2012 | Elberbaum |

(Continued)

FOREIGN PATENT DOCUMENTS

| CN | 101515863 A | 8/2009 |
| CN | 201435002 | 3/2010 |

(Continued)

OTHER PUBLICATIONS

Singapore Office Action dated Jun. 28, 2016 for Singapore Application No. 10201510669Y which corresponds in priority to above-identified subject U.S. application.

(Continued)

*Primary Examiner* — Ruiping Li
(74) *Attorney, Agent, or Firm* — Knobbe Martens Olson & Bear LLP

(57) ABSTRACT

A system and method for customs inspection and release are disclosed. In one aspect, a system includes a device layer of devices for inspection and release, at least some of which generate subject detection data. The system also includes an adaptor layer of adaptors corresponding to the devices that receive detection data from its corresponding device and convert it into an event in a formatted message. The system also includes a message service layer including a bus that receives events from the adaptor layer and constructs event messages based on them. The system also includes a processing control layer that receives and processes event messages, generates instructions associated with them, and transmits the instructions to the message service layer, which constructs instruction messages based on the received instructions and transmits them to the adaptor layer. The adaptor layer converts them into device instructions that operate based on them.

12 Claims, 5 Drawing Sheets

(58) Field of Classification Search
    USPC ......................................................... 382/143
    See application file for complete search history.

(56) References Cited

U.S. PATENT DOCUMENTS

| | | | |
|---|---|---|---|
| 2005/0088320 A1* | 4/2005 | Kovach | G07C 5/085 340/933 |
| 2006/0142880 A1 | 6/2006 | Deen et al. | |
| 2010/0249952 A1 | 9/2010 | Snide | |
| 2014/0266685 A1 | 9/2014 | Brueggen et al. | |

FOREIGN PATENT DOCUMENTS

| | | | |
|---|---|---|---|
| CN | 101719960 A | 6/2010 |
| CN | 102790781 A | 11/2012 |
| CN | 103377498 | 10/2013 |
| CN | 104112190 A | 10/2014 |
| CN | 104237262 A | 12/2014 |
| CN | 201314950 U | 5/2015 |

OTHER PUBLICATIONS

Li, Liang-Zhi, et al., "Design of Data Collection System Based on CAN Field Bus," Journal of Liaoning Institute of Technology (Apr. 2005), vol. 25, No. 2, p. 84-86.
Written Opinion dated Mar. 1, 2017 for Singapore Application No. 10201510669Y which corresponds in priority to above-identified subject U.S. application.

\* cited by examiner

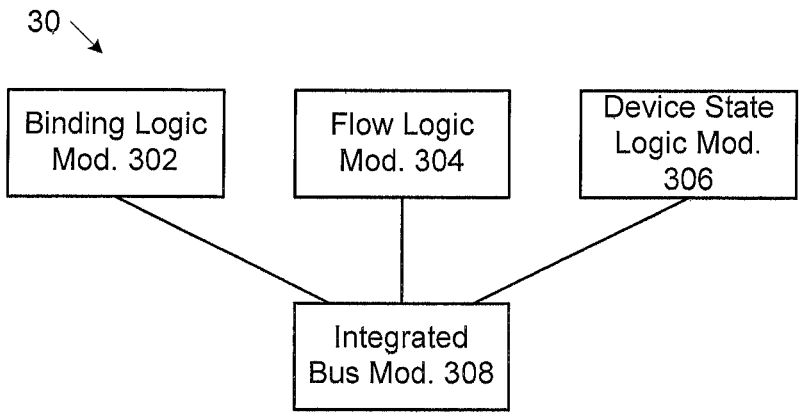
Fig. 3
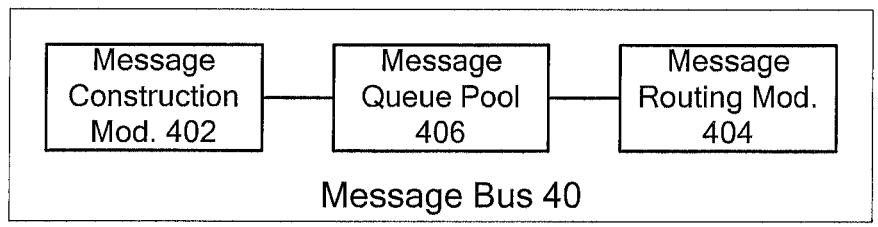
Fig. 4
Example of Event Message Format
| Site | Subject ID | Device Type | Device No. | Reception Time | Event Content |
|---|---|---|---|---|---|
| 502 | 504 | 506 | 508 | 510 | 512 |
Fig. 5A
Example of Instruction Message Format
| Site | Device Type | Device No. | Instr. Source | Instr. Content |
|---|---|---|---|---|
| 502 | 504 | 506 | 514 | 516 |
Fig. 5B

CUSTOMS INSPECTION AND RELEASE SYSTEM AND METHOD

RELATED APPLICATIONS

This application claims priority to Chinese Patent Application No. 201410834408.9, filed Dec. 26, 2014, entitled "CUSTOMS INSPECTION AND RELEASE SYSTEM AND METHOD" which is incorporated herein by reference in its entirety.

BACKGROUND

Field

The disclosed technology relates to customs inspection and clearance, and more particularly to customs inspection and release systems and methods.

Description of the Related Technology

In conventional customs inspection and release systems, container/vehicle inspection, site traffic management, vehicle/container recognition, radioactive substance detection, radioactive isotope recognition and the like are performed independently from one another. When a container/vehicle arrives at the site entrance, it will be guided, by an operator, to pass through an X-ray container/vehicle inspection device for inspection and then into a waiting area to wait for inspection result. After an operator responsible for image review has analyzed the container/vehicle based on a scan image and other related information to reach a conclusion, the operator in the waiting area is informed of the conclusion and then guides the vehicle to a manual inspection area or an exit area based on the inspection result for the vehicle. When the vehicle arrives at the exit area, an operator confirms that the inspection of the vehicle has completed before it can be released. Such inspection and release system with independent operations among the respective areas and/or the respective devices relies on informing and manual guidance by the operators, and thus is inefficient and high in labor cost. In addition, the customs inspection and release system operates independently from a customs declaration system, a logistics system and the like, and thus they cannot share information on the same subject under inspection, resulting in inefficient overall operations.

SUMMARY OF CERTAIN INVENTIVE ASPECTS

One aspect is a customs inspection and release system. The system includes a device layer comprising a plurality of devices for inspection and release, at least one of the plurality of devices configured to detect a subject and generate detection data. The systems further includes an adaptor layer comprising a plurality of adaptors corresponding to the plurality of devices, respectively, each configured to receive the detection data from its corresponding device and convert the detection data into an event in a form of a predetermined message service interface protocol. The systems further includes a message service layer comprising a message bus configured to receive events from the adaptor layer and construct event messages based on the events. The systems further includes a processing control layer comprising a logic unit configured to receive and process the event messages from the message bus, generate instructions associated with the event messages and transmit the instructions to the message service layer. The message service layer constructs instruction messages based on the received instructions and transmits the instruction messages to the adaptor layer. The adaptor layer converts the instruction messages into instructions in a form suitable for the corresponding devices and transmits the instructions to the device layer. The corresponding devices in the device layer operate based on the received instructions.

In an embodiment, the processing control layer further includes a central control unit configured to, via a user interface, monitor operation states of the devices and a state of the subject. The central control unit is further configured to, in response to a user operation, generate an instruction and transmit the instruction to the message service layer.

In an embodiment, the logic unit includes a binding logic module configured to bind a plurality of discrete events associated with the same subject to the subject. In an embodiment, the logic unit includes a flow logic module configured to process the bound events to generate an instruction corresponding to a result of the processing. In an embodiment, the logic unit includes a device state logic module configured to monitor states of the plurality of devices and issue a warning upon detecting an abnormal state. In an embodiment, the logic unit includes an integrated bus module coupled to the message bus, the binding logic module, the flow logic module and the device state logic module and configured to receive the event messages from the message bus, forward the received event messages to the respective logic modules, receive an instruction or a warning from the respective logic modules and transmit it to the message bus.

In an embodiment, the message bus includes a message construction module configured to construct the event messages and the instruction messages based on the received events and instructions, respectively. In an embodiment, the message bus includes a message routing module configured to route the event messages to the processing control layer and the instruction messages to at least one corresponding adaptor among the plurality of adaptors in the adaptor layer. In an embodiment, the message bus includes a message queue pool comprising an event message queue pool for buffering and queuing the event messages and an instruction message queue pool for buffering and queuing the instruction messages.

In an embodiment, the event messages each indicates a site where the subject is located, an identifier of the subject, a type and serial number of the device for the subject, time at which the detection data is received from the device, and an event content. In an embodiment, the instruction messages each indicates the site where the subject is located, the type and serial number of the device for the subject, a source of the instruction and an instruction content.

In an embodiment, the plurality of devices includes at least two of a container/vehicle radiophotography inspection device, a radioactive material detection device, a license plate recognition device, a container code recognition device, a digital video recording device and a traffic control device.

In an embodiment, the central control unit is configured to display a scan image in real time while the subject is being scanned, display a photo and a recognition result of a license plate of the subject, display a photo and a recognition result of a container code of the subject, control a traffic control device in the site where the subject is located and/or modify the recognition result of the subject in response to an input from the user interface.

In an embodiment, the processing control layer further includes: an image detection unit comprising an image analysis station allowing a user to analyze a scan image of the subject, to determine whether the subject is suspicious or not. In an embodiment, the processing layer further includes a re-inspection station allowing a user to re-inspect the suspicious subject.

In an embodiment, the processing control layer further includes an information management unit configured to maintain user information, maintain subject information, maintain commuter car information, query information and statistics, and/or configure system parameters.

In an embodiment, the message service layer is further configured to receive other events from other customs systems for processing at the processing control layer and transmit processing results to the other customs systems. In an embodiment, the other customs systems include a customs declaration system and/or a logistics system.

In an embodiment, the binding logic module in the processing control layer is further configured to bind discrete events among the other events that are associated with the same subject to the subject.

Another aspect is a customs inspection and release method. The method includes detecting, by at least some of a plurality of devices, a subject to generate detection data. The method includes receiving, by each of a plurality of adaptors corresponding to the plurality of devices, respectively, the detection data from its corresponding device and converting the detection data into an event in a form of a predetermined message service interface protocol. The method includes receiving, by a message bus, events from the adaptors and constructing event messages based on the events. The method includes receiving and processing the event messages from the message bus, generating instructions associated with the event messages and transmitting the instructions to the message bus. The method includes constructing, by the message bus, instruction messages based on the received instructions and transmitting the instruction messages to the respective adaptors. The method includes converting, by the respective adaptors, the instruction messages into instructions in a form suitable for the corresponding devices and transmitting the instructions to the corresponding devices. The method includes operating, by the corresponding devices, based on the received instructions.

In an embodiment, the method further includes providing a user interface for monitoring operation states of the devices and a state of the subject, and in response to a user operation, generating an instruction and transmitting the instruction to the message bus.

In an embodiment, the step of receiving and processing the event messages from the message bus, generating instructions associated with the event messages and transmitting the instructions to the message bus includes receiving event messages from the message bus; binding a plurality of discrete events associated with the same subject to the subject based on the event messages; processing the bound events to generate an instruction corresponding to a result of the processing; and transmitting the generated instruction to the message bus.

In an embodiment, the method further includes receiving, by the message bus, other events from other customs systems for processing, and transmitting processing results to the other customs systems. In an embodiment, the other customs systems include a customs declaration system and/or a logistics system.

BRIEF DESCRIPTION OF THE DRAWINGS

The above and other aspects, features and advantages will become more apparent with reference to the following description taken in conjunction with the figures where similar reference numerals denote the same elements.

FIG. 3 is a block diagram showing a structure of a logic unit in a customs inspection and release system according to an exemplary embodiment of the disclosed technology.

FIG. 4 is a block diagram showing a structure of a message bus in a customs inspection and release system according to an exemplary embodiment of the disclosed technology.

FIGS. 5A and 5B show exemplary formats of an event message and an instruction message used in a customs inspection and release system according to an exemplary embodiment of the disclosed technology.

DETAILED DESCRIPTION OF CERTAIN ILLUSTRATIVE EMBODIMENTS

The specific embodiments of the disclosed technology will be described in detail below. It should be noted that the embodiments herein are used for illustration only, without limiting the disclosed technology. In the description below, a number of specific details are explained to provide better understanding of the disclosed technology. However, it is apparent to those skilled in the art that the disclosed technology can be implemented without these specific details. In other instances, well known circuits, materials or methods are not described specifically so as not to obscure the disclosed technology.

Throughout the specification, the reference to "one embodiment," "an embodiment," "one example" or "an example" means that the specific features, structures or properties described in conjunction with the embodiment or example are included in at least one embodiment of the disclosed technology. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the term "and/or" used herein means any and all combinations of one or more listed items.

Figure 1:
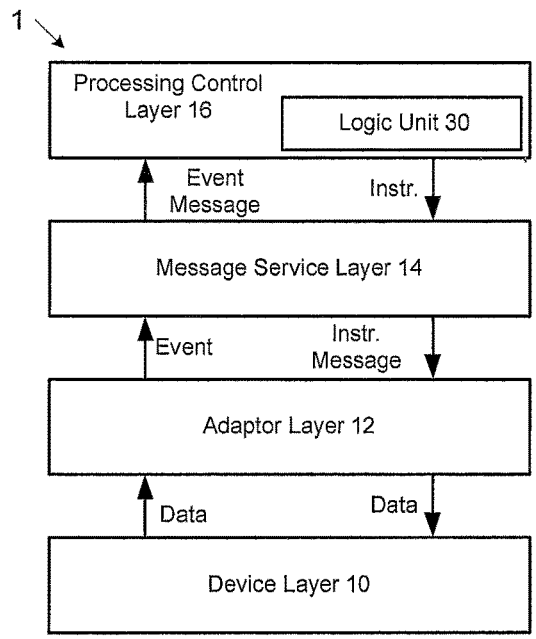
FIG. 1 is a block diagram showing a customs inspection and release system according to an exemplary embodiment of the disclosed technology.

In the following, the exemplary embodiments of the disclosed technology will be described with reference to the figures. FIG. 1 is a block diagram showing a customs inspection and release system according to an exemplary embodiment of the disclosed technology. As shown, the customs inspection and release system 1 can include a device layer 10, an adaptor layer 12, a message service layer 14 and a processing control layer 16. The device layer 10 can include a plurality of devices for inspection and release. At least some of the plurality of devices are configured to detect a subject and generate detection data. For example, the plurality of devices may include at least two of a container/vehicle radiophotography inspection device, a radioactive material detection device, a license plate recognition device, a container code recognition device, a digital video recording device and a traffic control device. The adaptor layer 12 can include a plurality of adaptors corresponding to the plurality of devices, respectively, each configured to receive the detection data from its corresponding device and convert the detection data into an event in a form of a predetermined message service interface protocol. The message service layer 14 can include a message bus 40 configured to receive events from the adaptor layer and construct event messages based on the events. The processing control layer 16 can include a logic unit 30 configured to receive and process the event messages from the message bus, generate instructions associated with the event messages and transmit the instructions to the message service layer 14. The message service layer 14 constructs instruction messages based on the received instructions and transmits the instruction messages to the adaptor layer 12. The adaptor layer 12 converts the instruction messages into instructions in a form suitable for the corresponding devices and transmits the instructions to the device layer 10. The corresponding devices in the device layer 10 operate based on the received instructions. The structures and functions of the respective layers will be described in detail below.

Figure 2:
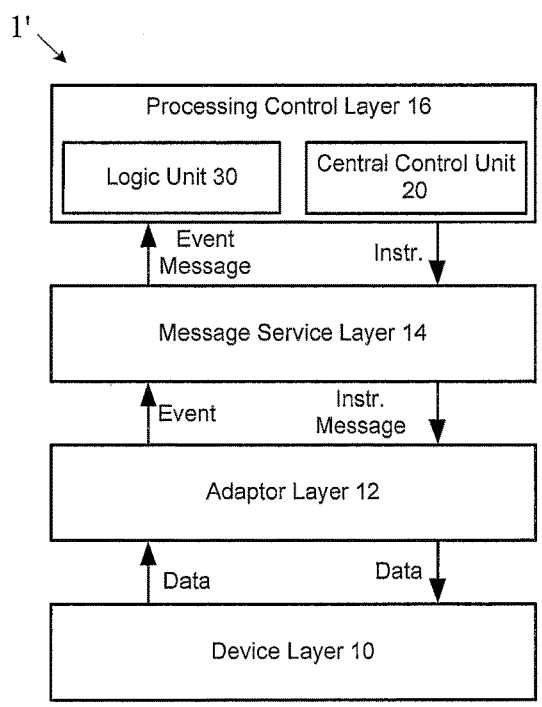
FIG. 2 is a block diagram showing a customs inspection and release system according to another exemplary embodiment of the disclosed technology.

FIG. 2 is a block diagram showing a customs inspection and release system 1' according to another exemplary embodiment of the disclosed technology. The customs inspection and release system 1' in FIG. 2 differs from the customs inspection and release system 1 in FIG. 1 in that the processing control layer 16 further includes a central control unit 20 configured to provide a user interface for monitoring operation states of the devices and a state of the subject, and in response to a user operation, generate an instruction and transmit the instruction to the message service layer 14. In an example, the central control unit 20 is configured to perform one or more of the following via the user interface (e.g., including input/output devices such as a display, a touch screen, a keyboard and a mouse): displaying a scan image in real time while the subject is being scanned; displaying a photo and a recognition result of a license plate of the subject; displaying a photo and a recognition result of a container code of the subject; and controlling a traffic control device in the site where the subject is located. The user can performs various user operations via the user interface, such as modifying the recognition result of the subject or performing control operations and issue control instructions.

The customs inspection and release systems 1 and 1' as shown in FIG. 1 and FIG. 2, respectively, are exemplary only. A customs inspection and release system according to the disclosed technology may include additional components. For example, the processing control layer 16 can further include: an image detection unit including an image analysis station and a re-inspection station and allowing a user to analyze a scan image of the subject at the image analysis station to determine whether the subject is suspicious or not and re-inspect the suspicious subject at the re-inspection station. In an example, the processing control layer 16 can further include an information management unit configured to maintain user information, maintain subject information, maintain commuter car information, inquire and statistically process information, and/or configure system parameters. As an example, the information management unit may include a database for storing and managing various information, and provide a user interface which allows the user to perform information query and statistics and/or system parameter configuration.

In the illustrated customs inspection and release system, the adaptor layer 12 and the message service layer 14 are provided between the device layer 10 and the processing control layer 16. The adaptor layer 12 converts data collected by the devices using different interface protocols into a form of predetermined, uniform message service interface protocol, and transmits the converted data to the message service layer 14 in the form of events. The message service layer 14 encapsulates the received events into event messages suitable to be received and processed at the processing control layer 16. Further, the message service layer 14 encapsulates the instructions from the processing control layer 16 into instruction messages suitable to be received and processed at the adaptor layer 12. Then, the adaptor layer 12 converts the instruction messages into forms suitable to be received and executed by the corresponding devices. In this way, a uniform interface, message construction and transmission mechanism is provided in the above customs inspection and release system, such that the information obtained by the respective devices in the device layer 10 can be gathered together while the respective devices are operating independently from each other, and the respective device and the subject can be monitored and controlled remotely through a uniform platform, thereby achieving efficient, intelligent inspection and release and minimizing the labor cost. Further, with an event-driven scheme, the data generated by the devices can be collected to form site events, which are bound into flow events to be processed by the flow logic unit to generate site instructions for controlling the devices. In this way, it is possible to ensure a real-time system response and a centralized data management. Further, the system design can be divided into modules on a basis of tasks, such that the development and maintenance of each module can be made only in consideration of its task. Hence, the processing control layer is not required to consider removal and/or addition of the devices. As a result, the devices can be added and/or removed dynamically with almost no change in the processing control layer.

According to an exemplary embodiment of the disclosed technology, the message service layer 14 is further configured to receive other events from other customs systems for processing at the processing control layer 16 and transmit processing results to the other customs systems. Here the other customs systems may include e.g., a customs declaration system and/or a logistics system. In this way, not only all the devices in the inspection and release system can be correlated, but also the system can be integrated with the other customs systems via the message service layer. In this way, all the devices and all the related systems in the entire customs region can be integrated, arranged and coordinated to improve the overall operation efficiency.

FIG. 3 is a block diagram showing a structure of a logic unit 30 in a customs inspection and release system according to an exemplary embodiment of the disclosed technology. The logic unit 30 can include a binding logic module 302, a flow logic module 304, a device state logic module 306 and an integrated bus module 308.

The binding logic module 302 is configured to bind a plurality of discrete events associated with the same subject to this subject. The inspection flow is subject-oriented, and the subject under inspection passes through the plurality of devices as described above and a plurality of sites. For example, an inspection site is generally divided into five sites related to the inspection flow and a commuter car access. The five sites include a Local Inspection Site (LIS), a Vehicle Waiting Site (VWS), a Secondary Inspection Site (SIS), a Central Control Site (CCS) and an Exit Verification Site (EVS). Different devices are deployed in the respective sites, and various signals collected and events generated by these devices are discrete and need to be bound together based on their correlation. For example, an identifier (ID) of the subject (e.g., a license plate number of a vehicle or a container code) can be included in an event message and the events having the same subject ID can be bound to the identified subject. The binding process allows the respective events associated with the same subject to be considered jointly, and prepares for subsequent, comprehensive and accurate processing and control.

In the case where the other customs systems have been integrated via the message service layer 14, the binding logic module 302 in the processing control layer 16 can be further configured to bind discrete events from the other systems that are associated with the same subject to this subject, such that the information on the subject can be shared among the systems and the operation efficiency can be further improved.

The flow logic module 304 is configured to process the bound events to generate an instruction corresponding to the processing result. For example, the flow logic module 304 can include a plurality of application modules for a plurality of data collection or detection devices. Each of the application modules may be configured to process events from a corresponding device and generate a processing result. The processing results for the same subject can be considered jointly for generating instructions for the respective devices.

The device state logic module 306 is configured to monitor states of the plurality of devices and issue a warning upon detecting an abnormal state. For example, based on the received state data for each device, the device state logic module 306 can detect whether the device has failed and issue a warning upon determining the presence of such failure, so as to inform an operator to maintain the device.

The integrated bus module 308 can be coupled to the message bus 40, the binding logic module 302, the flow logic module 304 and the device state logic module 306, and configured to receive the event messages from the message bus 40, forward the received event messages to the respective logic modules 302, 304 and 306, receive an instruction or a warning from the respective logic modules 302, 304 and 306, and transmit it to the message bus 40. For example, upon receiving an event message for a detection event associated with the subject, the integrated bus module 308 can forward the event message to the binding logic module 302 or the flow logic module 304 for processing. Upon receiving an event message related to a device state, the integrated bus module 308 can forward the event message to device state logic module 306 for processing. The integrated bus module 308 can provide configurable message transmitting, receiving and forwarding mechanisms, such that the development and maintenance of each logic module 302, 304 or 306 can focus on the tasks of the module, while the simple and general message transmitting, receiving and forwarding operations can be configured and carried out by the integrated bus module 308.

The structure and function of the logic unit 30 as shown in FIG. 3 are illustrative only, and can be modified, increased or decreased without departing from the teaching of the disclosed technology, as can be appreciated by those skilled in the art. The development and configuration of the logic unit 30 and the respective modules can be performed by utilizing e.g., programmable processors and servers.

FIG. 4 is a block diagram showing a structure of a message bus 40 in a customs inspection and release system according to an exemplary embodiment of the disclosed technology. The message bus 40 can include a message construction module 402, a message routing module 404 and a message queue pool 406.

The message construction module 402 can be configured to construct the event messages and the instruction messages based on the received events and instructions, respectively. The formats of the event messages and the instruction messages can be predetermined and/or user configurable. FIGS. 5A and 5B show exemplary formats of an event message and an instruction message used in a customs inspection and release system according to an exemplary embodiment of the disclosed technology. As shown, the event message may include a number of fields, indicating a site 502 where the subject is located, an identifier of the subject 504, a type 506 and serial number 508 of the device for the subject, a time 510 at which the detection data is received from the device, and an event content 512, respectively. The instruction message may also include a number of fields, indicating the site 502 where the subject is located, the type 506 and serial number 508 of the device for the subject, a source of the instruction 514 and an instruction content 516, respectively. An event or instruction can be described in a message of a {key, value} pair type, where the key and the value are both character strings. The message formats shown in FIGS. 5A and 5B are illustrative only and any appropriate message format can be designed depending on design requirements by those skilled in the art.

The message routing module 404 is configured to route the event messages to the processing control layer 16 and the instruction messages to at least one corresponding adaptor among the plurality of adaptors in the adaptor layer 12. In an example, based on the content of an event message, the message routing module 404 can route the event message to one or more of the logic unit, the central control unit, the image detection unit and the information management unit. Further, based on an identifier of a device in an instruction device, the message routing module 404 can route the instruction message to an adaptor corresponding to the identified device.

The message queue pool 406 can include an event message queue pool for buffering and queuing the event messages and an instruction message queue pool for buffering and queuing the instruction messages. In an example, when a number of event messages are received from a number of sites or a number of devices, these event messages can be sorted based on the sites and/or device identifiers and/or event contents carried in the messages and placed into a queue for transmission. In an example, when instruction messages from the logic unit and the central control unit are received, these instruction messages can be sorted based on the sites and/or device identifiers and/or message sources and/or instruction contents carried in the messages and placed into a queue for transmission. The sorting rules as used here can be predetermined or configured by the user.

Figure 6:
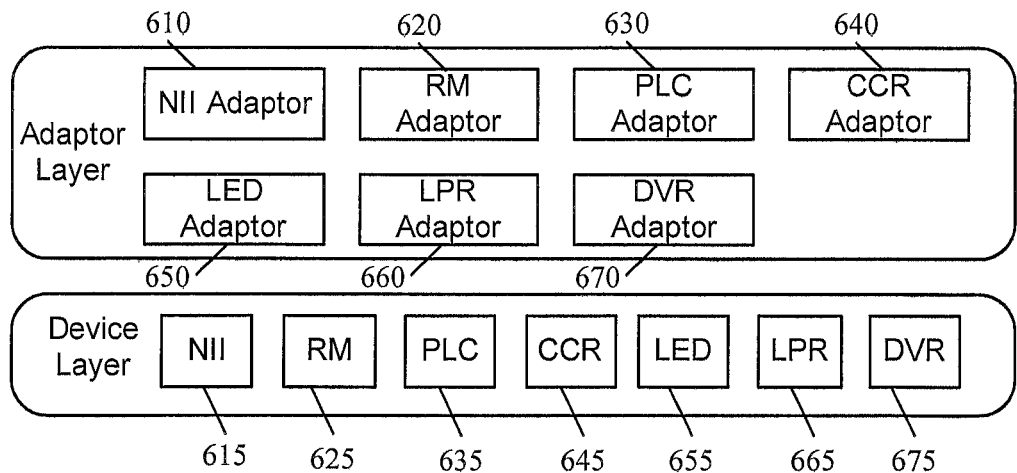
FIG. 6 is a schematic diagram showing an adaptor layer and a device layer in a customs inspection and release system according to an exemplary embodiment of the disclosed technology.

FIG. 6 is a schematic diagram showing an adaptor layer 12 and a device layer 10 in a customs inspection and release system according to an exemplary embodiment of the disclosed technology. FIG. 6 shows a plurality of devices and their corresponding adaptors.

A container/vehicle radiophotography inspection device (or Non-Intrusive Inspection, NII 615) can scan the subject (e.g., a container or a vehicle) to form a perspective image for an inspector to inspect whether items inside the container are eligible without opening the container. In an example, an NII interface module can be added as an NII adaptor 610. In another example, the container/vehicle radiophotography inspection device can include an NII device and an algorithm workstation which provide information to the outside via different interfaces. In order to interface with the entire system, the NII interface module 615 as well as a Programmable Logic Circuit (PLC) 630 and a PLC interface module 635 can be added as adaptors. In this way, scan results by the container/vehicle radiophotography inspection device, real-time thumbnails and device states can be transferred to the processing control layer 16 via a uniform message interface.

A radioactive material (RM) detection device 625 can include a detection device and a database. In order for the RM device to interface with the entire system, an RM collection module 620 can be added as an adaptor for transferring real-time conditions, such as an operation state of the RM device 625 and a detection state, to the processing control layer 16 via a uniform message interface.

A License Plate Recognition (LPR) device 665 can automatically take a picture of a license plate and recognize its content, thereby providing a discriminable feature of a vehicle. An LPR adaptor 660 can be added for transferring the license plate information to the processing control layer 16 via a uniform message interface.

A Container code Recognition (CCR) 645 device can automatically recognize the number of a container carried by a vehicle, such that the system can retrieve declaration information from the customs based on the number for reference by an image inspector in image inspection. A CCR adaptor 640 can transfer the container code to the processing control layer 16 via a uniform message interface.

A Digital Video Recording (DVR) device 675 can provide a video segment of a vehicle when it is being scanned. The DVR device 675 records video continuously. A DVR adaptor module 670 can retrieve a video of a specified time period from the DVR device 675 in response to an instruction conveyed from the processing control layer 16. In an example, the retrieved video segment can be transcoded and posted onto a streaming media service station.

A traffic control device may include a stop lever, a traffic light, a Light Emitting Diode (LED) 655 or the like, for restricting and guiding vehicles in the site. In an example, the stop lever and the traffic light can provide an electrical connection point to be controlled and collected by an LED adaptor 650. The LED can be a network device controlled by the processing control layer 16 directly via messaging.

The devices and adaptors listed above are illustrative only and it can be appreciated by those skilled in the art that more or less devices can be provided as desired.

Figure 7:
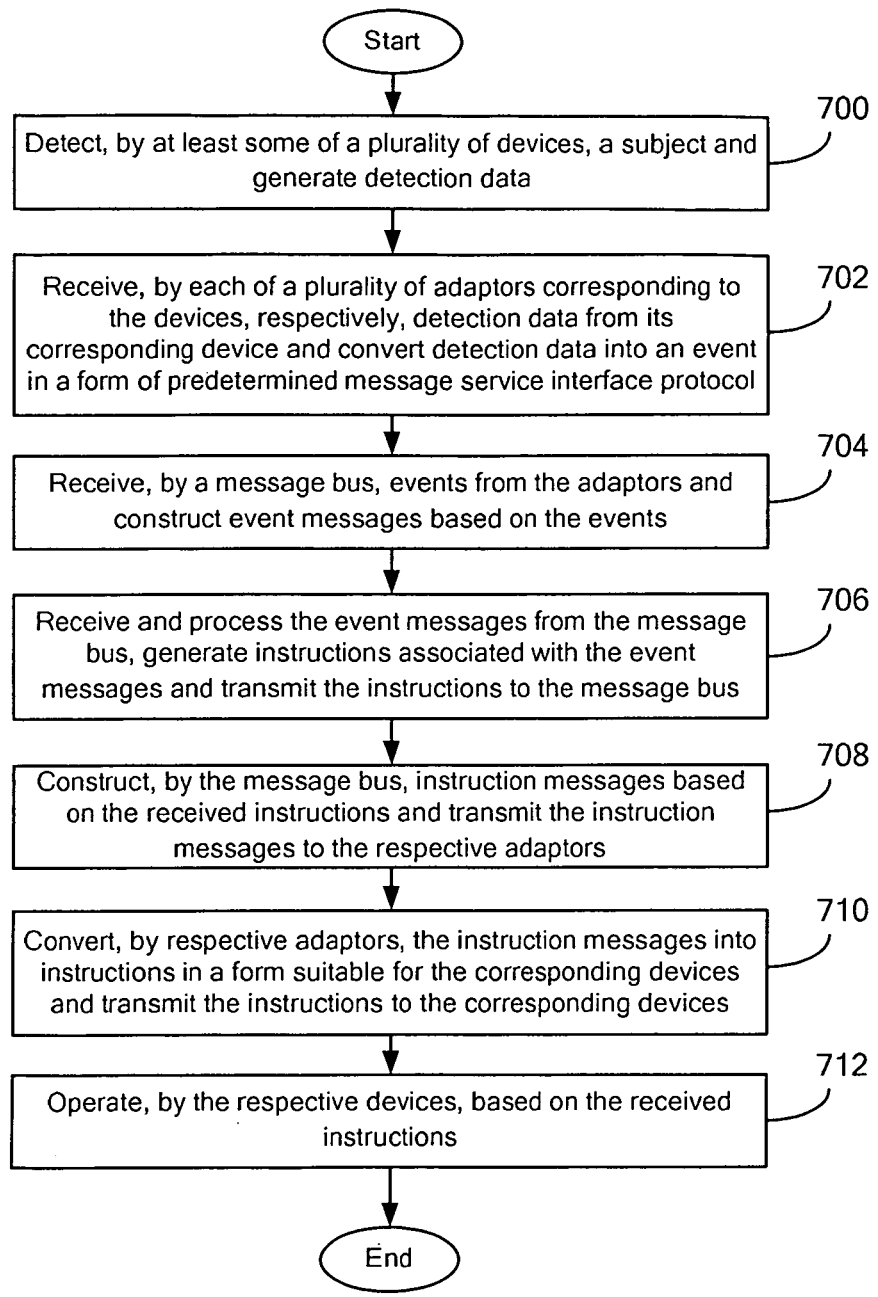
FIG. 7 is a flowchart illustrating a customs inspection and release method according to an exemplary embodiment of the disclosed technology.

Next, a customs inspection and release method according to an exemplary embodiment of the disclosed technology will be described with reference to the figure. In the flowchart of FIG. 7 illustrating a customs inspection and release method, at step 700, at least some of a plurality of devices detect a subject to generate detection data. At step 702, each of a plurality of adaptors corresponding to the plurality of devices, respectively, detects the detection data from its corresponding device and converts the detection data into an event in a form of a predetermined message service interface protocol. At step 704, a message bus receives events from the adaptors and constructs event messages based on the events. At step 706, the event messages from the message bus are received and processed, and instructions associated with the event messages are generated and transmitted to the message bus. At step 708, the message bus constructs instruction messages based on the received instructions and transmits the instruction messages to the respective adaptors. At step 710, the respective adaptors convert the instruction messages into instructions in a form suitable for the corresponding devices and transmit the instructions to the corresponding devices. At step 712, the corresponding devices operate based on the received instructions.

In an embodiment, the customs inspection and release method further includes: providing a user interface for monitoring operation states of the devices and a state of the subject, and in response to a user operation, generating an instruction and transmitting the instruction to the message bus.

In an embodiment, the step of receiving and processing the event messages from the message bus, generating instructions associated with the event messages and transmitting the instructions to the message bus includes receiving event messages from the message bus; binding a plurality of discrete events associated with the same subject to the subject based on the event messages; processing the bound events to generate an instruction corresponding to a result of the processing; and transmitting the generated instruction to the message bus.

In an embodiment, the customs inspection and release method further includes: receiving, by the message bus, other events from other customs systems for processing, and transmitting processing results to the other customs systems.

The customs inspection and release system and method according to the exemplary embodiments of the disclosed technology have been described above and will be further explained with reference to specific examples.

Figure 8:
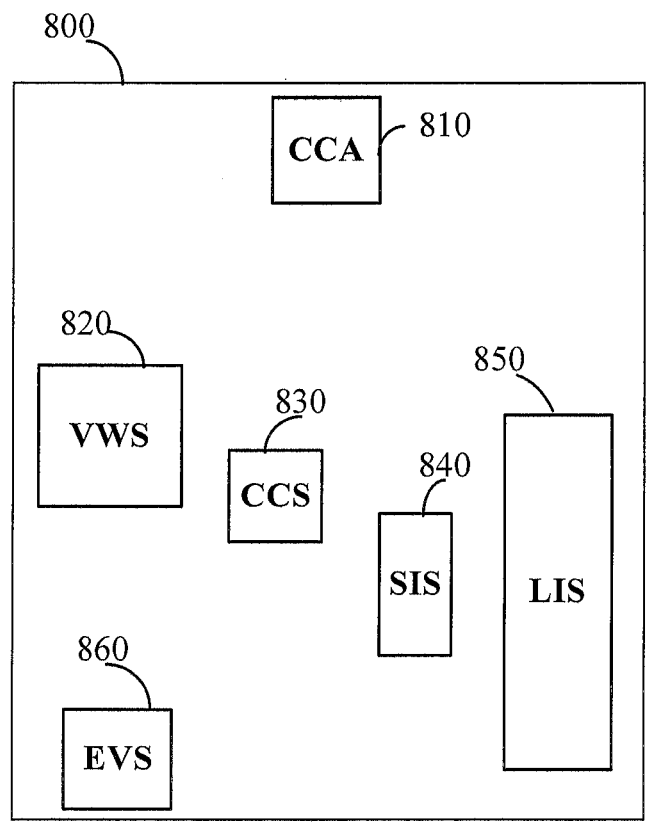
FIG. 8 is an inspection site where a customs inspection and release system and method according to an exemplary embodiment of the disclosed technology can be applied.

FIG. 8 is an inspection site 800 where a customs inspection and release system and method according to an exemplary embodiment of the disclosed technology can be applied. The inspection site can be divided into five sites related to the inspection flow, including a Local Inspection Site (LIS) 850, a Vehicle Waiting Site (VWS) 820, a Secondary Inspection Site (SIS) 840, a Central Control Site (CCS) 830 and an Exit Verification Site (EVS) 860, as well as a Commuter Car Access (CCA) 810 area. The CCS 830 is a site where the processing control layer 16 is deployed. In the following, the data is transmitted to the CCS 830, i.e., to the processing control layer 16 for processing and control. The operation of each of the sites will be described below, assuming that the subject is a vehicle carrying a container.

Local Inspection Site (LIS) 850

The vehicle enters the LIS 850.

An intercom and/or closed circuit television device, for example, can be provided for an operator to guide the vehicle at any time.

The license plate is recognized and the recognized data is transmitted to the CCS.

The traffic control device receives an instruction transmitted from the processing control layer 16 of the CCS 830 and guides the vehicle to enter the LIS 850.

RM detection is performed and the detected information is transmitted to the CCS 830.

The container code is recognized and the recognized data is transmitted to the CCS 830.

A scan device 615 performs X-ray scan and transmits the obtained information to the CCS 830.

The vehicle leaves the LIS 850.

Vehicle Waiting Site (VWS) 820

The vehicle enters the waiting site 820.

The license plate is recognized and the recognized data is transmitted to the CCS 830.

For example, an intercom and/or closed circuit television device can be provided for an operator to guide the vehicle at any time.

Based on a radioactive material detection result or an image detection result of the vehicle, the driver is prompted to go to the SIS 840 or the EVS 860 with an LED.

The vehicle leaves the VWS 820.

Secondary Inspection Site (SIS) 840

The vehicle enters the SIS 840.

The corresponding license plate is displayed with a LED.

For example, an intercom and/or closed circuit television device can be provided for an operator to guide the vehicle at any time.

An image inspection station displays the corresponding image and information.

If there is excessive radiation, a radioactive material detection is performed first and a radioactive conclusion is given.

The container is inspected to generate a secondary inspection conclusion.

The vehicle leaves the SIS 840.

Central Control Site (CCS) 830

An instruction is transmitted to the traffic control device in the CCS 830 to guide the vehicle to enter the site.

A recognized data for license plate is received from the CCS 830 and stored in a database.

RM detection information is received from the RM device 625, bound to the license plate data and stored in the database.

A recognized data for the container code is received from the CCS 830, bound to the license plate data and stored in the database.

The container/vehicle radiophotography inspection device 615 is informed to get ready for scanning.

A scan data is received from the container/vehicle radiophotography inspection device 615, bound to the license plate data and stored in the database.

An image inspector analyzes the scan image and gives an inspection conclusion.

The inspection conclusion is transmitted to a LED display 655 for the corresponding lane in the VWS 820.

If the subject is suspicious, the license plate information is transmitted to a LED display 655 in the SIS 840.

A recognized data for license plate is received from the EVS 860, and the database is inquired to determine whether the vehicle can leave the site or not.

A control instruction is transmitted to the traffic control device 655 of the EVS.

Exit Verification Site (EVS) 860

The vehicle enters the EVS 860.

The license plate is recognized and the recognized data is transmitted to the CCS 830.

For example, an intercom and/or closed circuit television device can be provided for an operator to guide the vehicle at any time.

The traffic control device 655 receives the control instruction transmitted from the CCS 830.

The vehicle leaves the EVS 860.

Commuter Car Access (CCA) 810

The vehicle enters the CCA 810.

The license plate is recognized and the recognized data is transmitted to the CCS 830.

For example, an intercom and/or closed circuit television device can be provided for an operator to guide the vehicle at any time.

The traffic control device 655 receives the control instruction transmitted from the CCS 830.

The vehicle enters or exits from the CCA 810.

Figure 9:
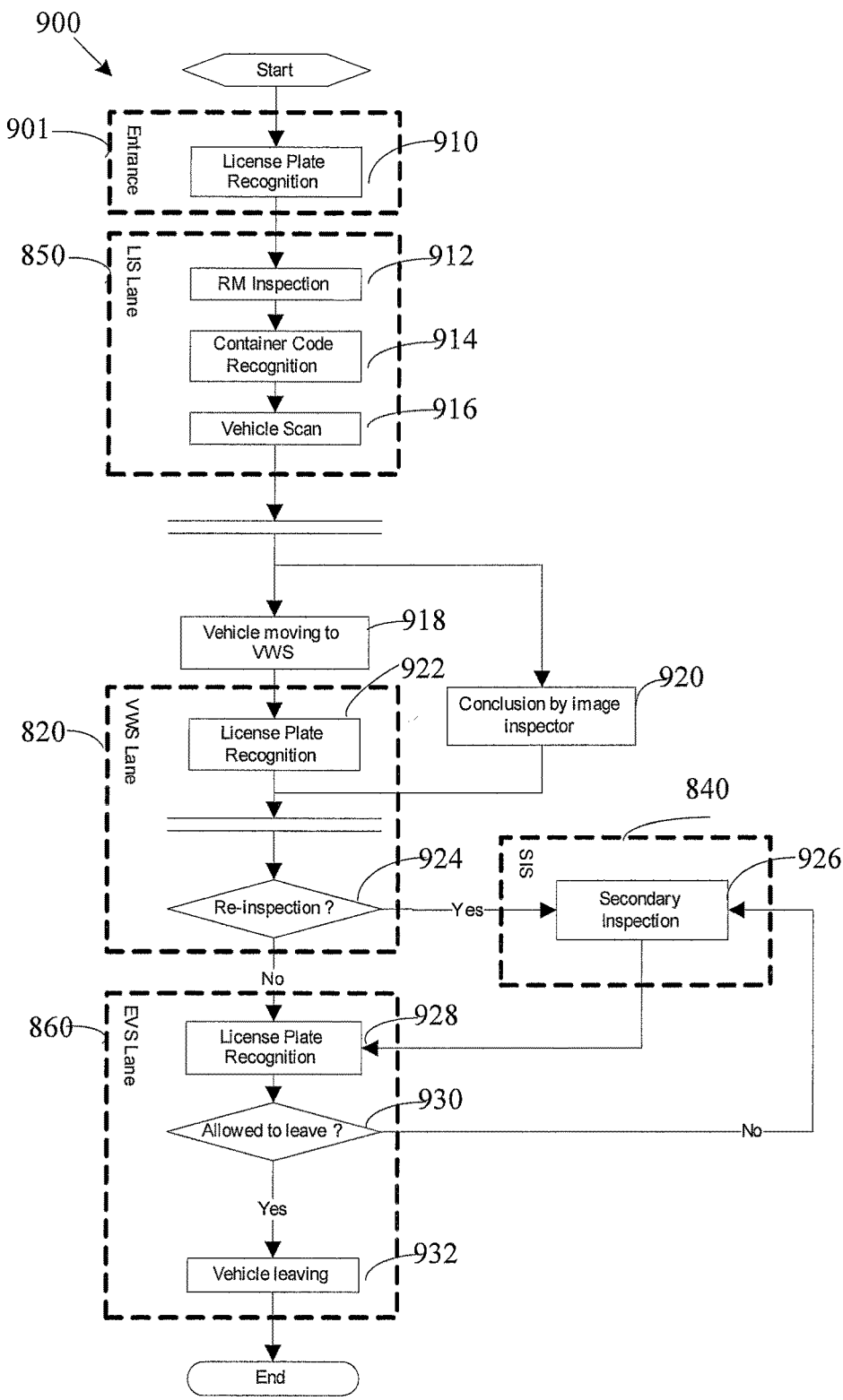
FIG. 9 is an inspection flow where a customs inspection and release system and method according to an exemplary embodiment of the disclosed technology can be applied.

With reference to the site shown in FIG. 8, FIG. 9 is an inspection flow 900 where a customs inspection and release system and method according to an exemplary embodiment of the disclosed technology can be applied. When a vehicle arrives at the site entrance 901, a ground sensor triggers license plate recognition 910 and then a stop lever is lifted automatically. Then, the vehicle enters the LIS 850 for RM detection 912, container code recognition 914 and NII scan 916. Next, the vehicle moves to the VWS 918 for license plate recognition 922. A LED 655 displays the vehicle state determined by an image inspector 920: release (qualified), secondary inspection 924 (suspicious) or wait (for image inspection which has not been completed). If the vehicle is suspicious, it enters the SIS 840 for secondary container-opening re-inspection 926 and a conclusion will be made with reference to the NII image. A LED 655 displays the vehicle that requires re-inspection and its inspection state. Then, the vehicle arrives at the EVS 860 for license plate recognition 928. If the vehicle is qualified, the stop lever will be lifted automatically and the vehicle will be released 930 and the vehicle will leave 932; otherwise the stop lever will not be lifted and a warning box will be popped up in the CCS 830 and the image inspection station to inform that the vehicle is not qualified.

For a commuter car, when a registered car arrives at the CCA 810, the stop lever will be lifted automatically and the car will be released. For an unregistered car, it is required to request via intercom for the stop lever to be lifted manually.

In the following, exemplary abnormal flows and countermeasures in the customs inspection and release system and method according to an exemplary embodiment of the disclosed technology will be described.

For example, when a vehicle arrives at the site entrance 901 and presses the ground sensor twice, it triggers two consecutive license plate recognitions which may have different results. In this case, the vehicle cannot be detected and bound correctly. Hence, the container/vehicle radiophotography inspection device 6610 can provide a number of photoelectric switches arranged along a lane for the binding logic module in the logic unit 30 to determine whether the vehicle is moving forward and backward. The binding logic module 302 can make this determination by quickly checking the states of the photoelectric switches. When it determines that the vehicle that pressed the ground sensor previously did not enter the inspection lane, it ignores the result of the first recognition.

If the vehicle enters the LIS lane 850 and then travels backward to get out of the lane, there could be two possible situations. First, the vehicle moves out of the ground sensor area and travels back and thus presses the ground sensor again. This will cause the license plate to be recognized again and the recognition would fail. Hence, if it is detected by the photoelectric switches along the lane that the vehicle does not enter the lane, this recognition failure event can be ignored. Second, the vehicle travels back before it leaves the ground sensor area, which will not cause the license plate to be recognized again. The binding logic module 302 can determine that the vehicle does not enter the lane by quickly checking the states of the photoelectric switches. When the vehicle triggers license plate recognition 910 again, the previous recognition result will be ignored.

If the license plate recognition fails, the CCS 830 will be notified to designate a license plate number manually for binding. In particular, if the license plate recognition at the entrance fails, the vehicle can move on for inspection and move to the VWS 820. A serial number can be assigned to the vehicle as its unique identifier and the photo of the license plate can be stored for reference in the subsequent operation for designating the license plate. For example, if the vehicle is stuck in the VWS 820 since the operator in the CCS 830 does not designate a license plate number timely, the operator in the CCS 830 needs to designate a license plate number immediately. If the license plate recognition fails while the vehicle is in the VWS 820 or EVS 860, the vehicle would be stopped and the operator in the CCS 830 needs to designate a license plate number immediately.

If the container code recognition goes wrong or fails, an operator in the CCS 830 will be notified to designate a container code manually. The failure in the container code recognition does not prevent the vehicle from moving for inspection and to the VWS 820. The photo obtained in the container code recognition can be recorded and, during the image inspection in the image inspection station, the container code can be designated manually and the declaration information can be retrieved. If the container code recognition has not been triggered, the container code recognition device will report this event and a reminder dialog box will be popped up in the CCS 830.

In the case where the vehicle enters the LIS lane 850 immediately followed by another vehicle, the user interface of the CCS 830 informs an operator, such that the operator can find the other vehicle from a video segment and guide it to move out of the inspection site for re-inspection.

There could be several situations of device failures while the vehicle is moving into the site.

If the license plate recognition device 665 fails, the binding logic module 302 has not received the license plate recognition information after a defined period has lapsed since a signal indicating that the RM 625 has entered an inspection mode is received. In this case, the CCS 830 can be notified that the license plate recognition device 665 may fail and an operator can designate a license plate number for the current vehicle manually and avoid any further vehicles from entering the site, so as to fix the device.

If the RM detection device 665 fails, e.g., if the system finds out that the connection to the RM 665 has lost, or a RM failure signal is received, an operator in the CCS 830 is notified. The operator can select to guide the current vehicle to move out of the site for re-inspection or to ignore its RM information.

If the container code recognition device fails, e.g., if the system finds out that the connection to the container code recognition device 645 has been lost, an operator in the CCS 830 is notified. The operator can designate a license plate number for the current vehicle manually and avoid any further vehicles from entering the site, so as to fix the device.

If the container/vehicle radiophotography inspection 610 device fails, e.g., if the system finds out that the connection to the container/vehicle radiophotography inspection device 610 has been lost, or a container/vehicle radiophotography inspection device 610 failure signal is received, an operator in the CCS 830 is notified. The operator guides it to move out of the inspection site for re-inspection and avoid any further vehicles from entering the site, so as to fix the device.

The foregoing detailed description has set forth various embodiments of the method and apparatus for marking a suspected object in a customs inspection and release system via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the disclosed technology may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the invention described herein can be embodied within a form that does not provide all of the features and benefits set forth herein, as some features can be used or practiced separately from others. The scope of the invention disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

What is claimed is:

1. A customs inspection and release system, comprising:
    a device layer comprising a plurality of devices for inspection and release, at least one of the plurality of devices configured to detect a subject and generate detection data;
    an adaptor layer comprising a plurality of adaptors corresponding to the plurality of devices, respectively, each configured to receive the detection data from its corresponding device and convert the detection data into an event in a form of a message service interface protocol;

a message service layer comprising a message bus configured to receive events from the adaptor layer and construct event messages based on the events; and
a processing control layer comprising;
  a logic unit configured to receive and process the event messages from the message bus, generate instructions associated with the event messages and transmit the instructions to the message service layer, and
  a central control unit configured to, via a user interface, monitor operation states of the devices and a state of the subject, the central control unit further configured to, in response to a user operation, generate an instruction and transmit the instruction to the message service layer;
wherein the message service layer constructs instruction messages based on the received instructions and transmits the instruction messages to the adaptor layer,
wherein the adaptor layer converts the instruction messages into instructions in a form suitable for the corresponding devices and transmits the instructions to the device layer,
wherein the corresponding devices in the device layer operate based on the received instructions, and
wherein the central control unit is configured to:
  display a scan image in real time while the subject is being scanned;
  display a photo and a recognition result of a license plate of the subject;
  display a photo and a recognition result of a container code of the subject;
  control a traffic control device in the site where the subject is located; and/or
  modify the recognition result of the subject in response to an input from the user interface.

2. The system of claim 1, wherein the logic unit comprises:
  a binding logic module configured to bind a plurality of discrete events associated with the same subject to the subject;
  a flow logic module configured to process the bound events and generate an instruction corresponding to a result of the processing;
  a device state logic module configured to monitor states of the plurality of devices and issue a warning upon detecting an abnormal state; and
  an integrated bus module coupled to the message bus, the binding logic module, the flow logic module and the device state logic module and configured to receive the event messages from the message bus, forward the received event messages to the respective logic modules, receive an instruction or a warning from the respective logic modules and transmit it to the message bus.

3. The system of claim 1, wherein the message bus comprises:
  a. message construction module configured to construct the event messages and the instruction messages based on the received events and instructions, respectively;
  a message routing module configured to route the event messages to the processing control layer and the instruction messages to at least one corresponding adaptor among the plurality of adaptors in the adaptor layer; and
  a message queue pool comprising an event message queue pool for buffering and queuing the event messages and an instruction message queue pool for buffering and queuing the instruction messages.

4. The system of claim 1, wherein the event messages each indicates a site where the subject is located, an identifier of the subject, a type and serial number of the device for the subject, a time at which the detection data is received from the device, and an event content, and wherein the instruction messages each indicates the site where the subject is located, the type and serial number of the device for the subject, a source of the instruction and an instruction content.

5. The system of claim 1, wherein the plurality of devices comprise at least two of a container/vehicle radiophotography inspection device, a radioactive material detection device, a license plate recognition device, a container code recognition device, a digital video recording device and a traffic control device.

6. The system of claim 1, wherein the processing control layer further comprises:
  an image detection unit comprising an image analysis station allowing a user to analyze a scan image of the subject to determine whether the subject is suspicious or not; and
  a re-inspection station allowing a user to re-inspect the suspicious subject.

7. The system of claim 1, wherein the processing control layer further comprises: an information management unit configured to:
  maintain user information,
  maintain subject information,
  maintain commuter car information,
  query information and/or statistics, and/or
  configure system parameters.

8. The system of claim 1, wherein the message service layer is further configured to receive other events from other customs systems for processing at the processing control layer and transmit processing results to the other customs systems, wherein the other customs systems comprise a customs declaration system and/or a logistics system.

9. The system of claim 8, wherein the binding logic module in the processing control layer is further configured to bind discrete events among the other events that are associated with the same subject to the subject.

10. A customs inspection and release method, comprising:
  detecting, by at least one of a plurality of devices, a subject to generate detection data;
  receiving, by each of a plurality of adaptors corresponding to the plurality of devices, respectively, the detection data from its corresponding device and converting the detection data into an event in a form of a message service interface protocol;
  receiving, by a message bus, events from the adaptors and constructing event messages based on the events;
  receiving and processing the event messages from the message bus, generating instructions associated with the event messages and transmitting the instructions to the message bus;
  constructing, by the message bus, instruction messages based on the received instructions and transmitting the instruction messages to the respective adaptors;
  converting, by the respective adaptors, the instruction messages into instructions in a form suitable for the corresponding devices and transmitting the instructions to the corresponding devices;
  operating, by the corresponding devices, based on the received instructions; and
  providing a user interface for monitoring operation states of the devices and a state of the subject, and in response to a user operation, generating an instruction and transmitting the instruction to the message bus, wherein monitoring operation states of the devices comprises:

displaying a scan image in real time while the subject is being scanned, displaying a photo and a recognition result of a license plate of the subject, displaying a photo and a recognition result of a container code of the subject, controlling a traffic control device in the site where the subject is located, and/or modifying the recognition result of the subject in response to an input from the user interface.

11. The method of claim 10, wherein said receiving and processing the event messages from the message bus, generating instructions associated with the event messages and transmitting the instructions to the message bus comprise:

receiving event messages from the message bus;

binding a plurality of discrete events associated with the same subject to the subject based on the event messages;

processing the bound events to generate an instruction conesponding to a result of the processing; and transmitting the generated instruction to the message bus.

12. The method of claim 10, further comprising:

receiving, by the message bus, other events from other customs systems for processing, and transmitting processing results to the other customs systems, and wherein the other customs systems comprise a customs declaration system and/or a logistics system.

* * * * *